United States Patent
De La Forest Divonne et al.

(10) Patent No.: US 9,723,637 B2
(45) Date of Patent: Aug. 1, 2017

(54) DYNAMIC CONNECTION OF A MOBILE TERMINAL TO A LOCAL NETWORK

(75) Inventors: Aymeric De La Forest Divonne, Carpiquet (FR); Jacques-Olivier Rebillon, Mutrecy (FR)

(73) Assignee: Orange, Paris (FR)

( * ) Notice: Subject to any disclaimer, the term of this patent is extended or adjusted under 35 U.S.C. 154(b) by 417 days.

(21) Appl. No.: 13/880,172

(22) PCT Filed: Oct. 12, 2011

(86) PCT No.: PCT/FR2011/052377
§ 371 (c)(1),
(2), (4) Date: Apr. 18, 2013

(87) PCT Pub. No.: WO2012/052660
PCT Pub. Date: Apr. 26, 2012

(65) Prior Publication Data
US 2013/0208693 A1 Aug. 15, 2013

(30) Foreign Application Priority Data

Oct. 22, 2010 (FR) .................................. 10 58662

(51) Int. Cl.
*H04W 4/00* (2009.01)
*H04W 76/02* (2009.01)
(Continued)

(52) U.S. Cl.
CPC ........... *H04W 76/02* (2013.01); *H04L 47/748* (2013.01); *H04W 8/26* (2013.01); *H04L 63/104* (2013.01); *H04W 12/08* (2013.01); *H04W 12/12* (2013.01); *H04W 36/0033* (2013.01); *H04W 36/08* (2013.01); *H04W 48/08* (2013.01); *H04W 74/004* (2013.01); *H04W 88/16* (2013.01); *H04W 92/20* (2013.01)

(58) Field of Classification Search
CPC .............................. H04W 40/04; H04L 47/748
USPC ......................................................... 370/329
See application file for complete search history.

(56) References Cited

U.S. PATENT DOCUMENTS 6,950,628 B1 * 9/2005 Meier ................. H04L 12/4641
340/7.1
7,173,918 B2 * 2/2007 Awater .................. H04W 36/22
370/331
(Continued)

FOREIGN PATENT DOCUMENTS

EP          2 019 560 A1     1/2009

OTHER PUBLICATIONS

Office Action issued for CN 201180051744.0 (Apr. 16, 2015).

*Primary Examiner* — Guang Li
(74) *Attorney, Agent, or Firm* — Drinker Biddle & Reath LLP

(57) ABSTRACT

A method for connecting a terminal to a telecommunication network via an access point. After a request to connect a terminal to a first access point, the first access point determines if it has access to a resource for serving the terminal and, if possible, serves the terminal. If not, the first access point requests, from at least one second access point to which is it connected, a resource for serving the terminal; and in the event that the resource is available to the second access point, the first access point transfers, to the terminal, data for enabling the terminal to connect to the second access point.

8 Claims, 3 Drawing Sheets

(51) Int. Cl.
*H04L 12/911* (2013.01)
*H04W 8/26* (2009.01)
*H04L 29/06* (2006.01)
*H04W 12/08* (2009.01)
*H04W 12/12* (2009.01)
*H04W 36/00* (2009.01)
*H04W 36/08* (2009.01)
*H04W 48/08* (2009.01)
*H04W 74/00* (2009.01)
*H04W 88/16* (2009.01)
*H04W 92/20* (2009.01)

(56) References Cited

U.S. PATENT DOCUMENTS

| | | | | |
|---|---|---|---|---|
| 7,177,649 | B1 * | 2/2007 | Nielsen | H04W 48/20 370/332 |
| 7,535,880 | B1 * | 5/2009 | Hinman | H04W 12/08 370/338 |
| 7,957,742 | B2 | 6/2011 | Kostic | H04L 5/023 370/328 |
| 8,107,414 | B2 * | 1/2012 | Wang | H04W 84/20 370/328 |
| 9,609,580 | B2 * | 3/2017 | Park | H04W 48/16 |
| 2002/0136226 | A1 * | 9/2002 | Christoffel | H04L 63/0428 370/401 |
| 2004/0095942 | A1 * | 5/2004 | Lung | H04L 47/125 370/400 |
| 2004/0224690 | A1 * | 11/2004 | Choi | H04W 36/0055 455/436 |
| 2005/0048953 | A1 * | 3/2005 | Ohara | H04L 12/2697 455/412.1 |
| 2006/0002404 | A1 * | 1/2006 | Igarashi | H04L 63/0236 370/401 |
| 2006/0029027 | A1 * | 2/2006 | Buckley | H04W 48/18 370/338 |
| 2006/0067290 | A1 * | 3/2006 | Miwa | A63F 13/327 370/338 |
| 2006/0153133 | A1 * | 7/2006 | Zhong | 370/331 |
| 2006/0223527 | A1 * | 10/2006 | Lee | H04W 48/08 455/432.2 |
| 2007/0002884 | A1 * | 1/2007 | Jaakkola | H04W 48/16 370/431 |
| 2007/0053362 | A1 * | 3/2007 | Garg | H04L 12/24 370/395.1 |
| 2007/0066306 | A1 * | 3/2007 | Cheng | H04L 63/06 455/445 |
| 2007/0159997 | A1 * | 7/2007 | Tsai | H04W 12/04 370/328 |
| 2007/0189243 | A1 * | 8/2007 | Wang | H04L 47/10 370/338 |
| 2007/0189247 | A1 * | 8/2007 | Wang | H04W 84/20 370/338 |
| 2008/0192715 | A1 * | 8/2008 | Sekhar | 370/338 |
| 2008/0225806 | A1 * | 9/2008 | Arian et al. | 370/338 |
| 2008/0259866 | A1 * | 10/2008 | Kostic | H04L 5/023 370/329 |
| 2008/0285520 | A1 * | 11/2008 | Forte | H04W 36/0011 370/331 |
| 2009/0190545 | A1 | 7/2009 | Kubota | |
| 2010/0020186 | A1 * | 1/2010 | Matsui | H04N 1/00249 348/211.2 |
| 2010/0075675 | A1 * | 3/2010 | Yang et al. | 455/436 |
| 2010/0215020 | A1 * | 8/2010 | Lee et al. | 370/331 |
| 2010/0296441 | A1 * | 11/2010 | Barkan | H04W 12/08 370/328 |
| 2010/0329177 | A1 * | 12/2010 | Murphy | H04W 12/06 370/328 |
| 2011/0164595 | A1 * | 7/2011 | So | H04W 12/06 370/338 |
| 2013/0109396 | A1 * | 5/2013 | Drazynski et al. | 455/444 |

* cited by examiner

DYNAMIC CONNECTION OF A MOBILE TERMINAL TO A LOCAL NETWORK

CROSS-REFERENCE TO RELATED APPLICATIONS

This application is the U.S. national phase of the International Patent Application No. PCT/FR2011/052377 filed Oct. 12, 2011, which claims the benefit of French Application No. 1058662 filed Oct. 22, 2010, the entire content of which is incorporated herein by reference.

FIELD

The invention relates to the portability of a communication of a mobile terminal on a local area network.

BACKGROUND

For example, in the context of multimedia usage by mobile terminals, a study has shown that currently at least 40% of communications are conducted via short-range local area networks (for example wifi wireless networks). Often, this communication is established at the residence of the users of such terminals, particularly via a gateway between a local area network of the above type and a wide area network (such as the Internet).

The most recent terminals even integrate a functionality of transferring a wifi communication in progress (voice or data) from one local network to another, when the terminal is for example in a mobile situation. In such an application of freely communicating via successive access points (or networked community "hotspots"), gateways of residential local area networks each form an access point. For example, a telephone call in progress on a mobile terminal located in the local area network of one gateway will be relayed by this gateway to the wide area network by voice over IP (VoIP). If the terminal leaves the range of this gateway and enters the range of another gateway, it is detected in the local area network of this new gateway and the latter gateway can relay the VoIP communication.

In one embodiment, the gateway is provided with a dedicated identifier or "SSID" ("Service Set Identifier"). This is a name identifying a wireless network according to IEEE standard 802.11 and can consist of 32 characters.

The gateway can use two independent SSID identifiers:
a private SSID for a conventional and household use of the gateway, and
a public SSID (in the context of "wifi community network" applications) for visitor terminals accessing the service of the gateway as a hotspot.

An authentication is performed based on these identifiers, which are usually static identifiers (for example login id and password, in messaging).

As an example, the user of a terminal needs to access his emails because of an urgent situation. The terminal first locates a wifi access point (a service for locating wifi hotspots may exist for this purpose). The terminal can connect to it once the user has provided his login id and password to a portal for local hotspot access.

Such a wifi community network application presents limitations, however.

A first limitation concerns the number of simultaneous connections which can be associated with a single community SSID, which is linked to the number of IP addresses available. Today, there can be at most only five connections per gateway acting as an access point.

Another limitation concerns the available bandwidth. The "wifi community network" service only offers 1 MB/s for sharing by all visitors, which divides the 1 MB/s bandwidth into 200 Kb/s (for five simultaneous connections).

In practice, when a terminal attempts to connect to a gateway with a community SSID identifier, if this SSID is saturated, the gateway cannot accept the new connection request (if five terminals are already connected to it). Then, in case of no wifi association with a community AP, the terminal attempts to connect to the closest access point providing a similar service. However, there is no guarantee that the terminal can connect to another access point (the latter may also be saturated) and no message is provided to inform it of this.

SUMMARY

The invention aims to improve the situation.

For this purpose, it proposes a method for connecting a terminal to a telecommunications network via an access point. In said method, following a connection request from a terminal to a first access point, this first access point determines whether it has the resources available to serve the terminal and, if so, serves the terminal.

In the meaning of the invention, the first access point is connected to at least a second access point, and in particular, if it is unable to serve the terminal:
the first access point requests a resource for serving the terminal, from at least the second access point, and
in the event that the resource is available at the second access point, the first access point transfers, to the terminal, data for connecting to the second access point.

Thus the invention advantageously allows offering a peer-to-peer connection of access points in order to know the availabilities of nearby access points at a given moment, particularly in terms of bandwidth.

If, on the other hand, the resource is not available from the second access point, the method can continue by having the first access point send a message to the terminal indicating that a connection is impossible. Preferably, the first access point makes such a decision after having polled all access points capable of communicating with the first access point.

In one embodiment, the first access point uses at least:
a first connection identifier for communicating with the terminal, and
a second connection identifier, distinct from the first identifier, for communicating with the second access point.

This arrangement advantageously allows reserving a dedicated connection identifier (for example SSID or "Service Set Identifier") for communications between access points only and keeping a connection identifier for connections with a mobile terminal, and does so in a manner that avoids security breaches.

Advantageously, communications that involve at least the second identifier are also encrypted.

Also advantageously, the invention can be implemented in a simple household gateway for said "wifi community network" service. The first access point can therefore be a gateway from a household local area network to a wide area network, with the communication of the terminal with the gateway being established by a wireless link. The gateway then preferably uses a third connection identifier for communicating with a household device in the local area network.

In the event of resource availability at the second access point, the first access point preferably reserves a connection for the terminal at the second access point and transfers to the terminal, among said connection data, at least one connection reservation identifier for the second access point.

Of course, an identifier for the second access point is also sent to the terminal. The terminal then simply needs to contact the second address point and provide it with a reservation identifier in order to have access to the resource detected by the first access point.

The invention also relates to a computer program comprising instructions for implementing the above method, when this program is executed by a processor. An example flowchart of a general algorithm of such a program is illustrated in FIG. 2 and discussed below.

The invention also relates to a device for connecting a terminal to a telecommunications network, as an access point for the terminal to said network, and in particular comprising means for implementing the above method, as the first access point. An example architecture of such a device is illustrated in FIG. 3 and discussed below.

For example, such a device may advantageously comprise means for acting as a gateway between a household local area network and said telecommunications network.

Such a device can then comprise:
  means for communicating with one or more access points, as second access points,
  and means for listening for information on the availability of these other access points to serve a terminal.

Such listening means can then regularly obtain information in order to remain updated on the resources available from the access points connected to the first access point.

The invention also relates to a system for connecting a terminal to a telecommunications network, via an access point for the terminal to this network, and comprising in particular at least:
  a device acting as the first access point of the invention, and
  a second access point comprising means for communicating, to the first access point, information on resource availability for serving a terminal.

An example configuration of such a system is illustrated in FIG. 1, discussed below.

BRIEF DESCRIPTION OF THE DRAWINGS

Other features and advantages of the invention will be apparent from reading the following description provided as an example and from examining the attached drawings in which.

DETAILED DESCRIPTION

Figure 1:
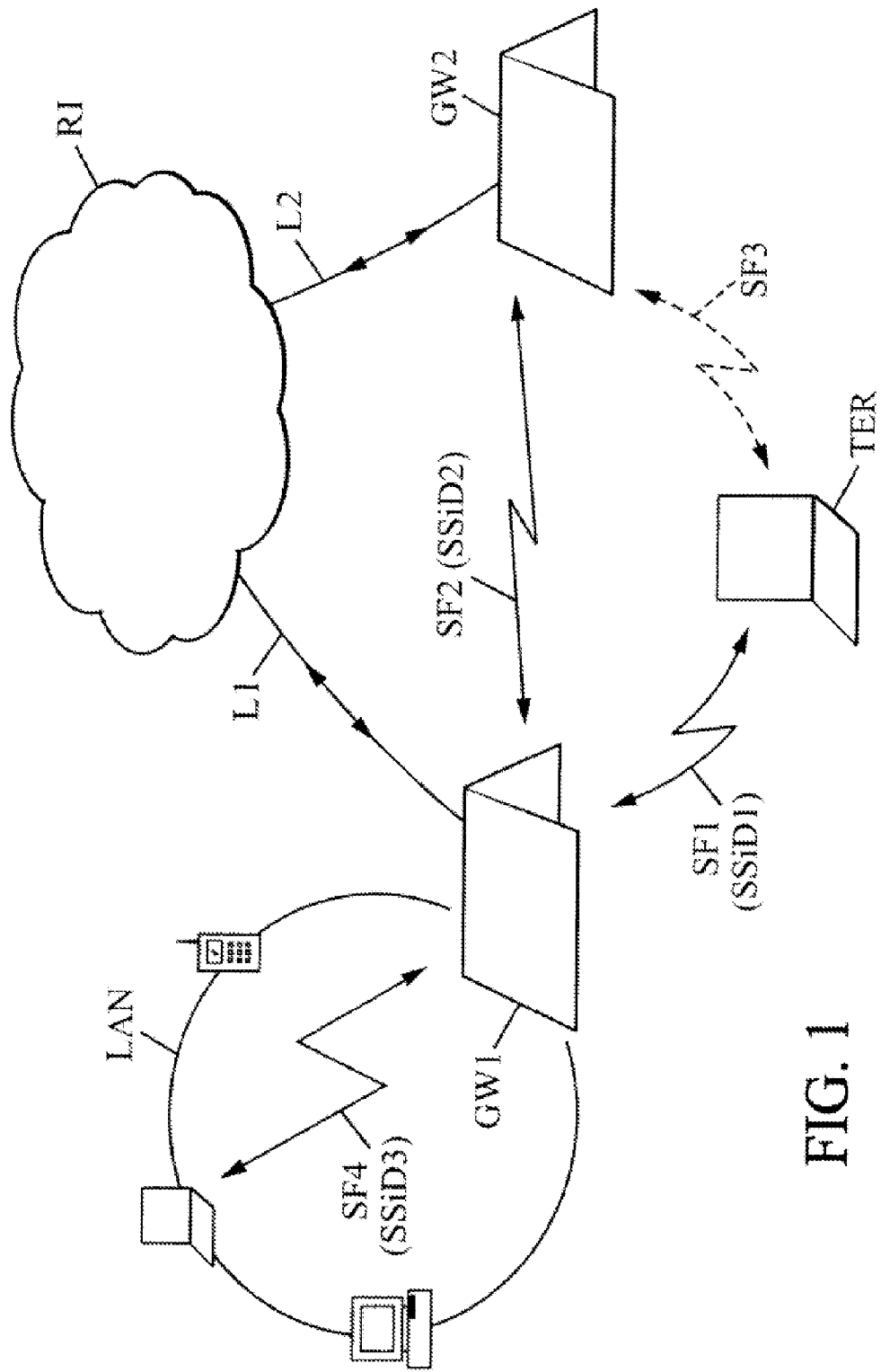
FIG. 1 illustrates a system with multiple access points and a terminal, in an example embodiment of the invention, FIG. 2 summarizes the steps of an example method of the invention, FIG. 3 schematically illustrates the structure of an access point in an example embodiment of the invention.

With reference to FIG. 1, a client terminal TER attempts to connect to the wide area network RI (for example the Internet) via the gateway GW1, by the link L1 with the wide area network and the wireless link SF1 (for example wifi) with the local area network LAN that the gateway GW1 manages.

Thus the terminal TER issues a connection request and the gateway GW1 uses a public identifier SSID1 to respond, in this example, that it is unable to satisfy the request from the terminal TER (for example because it is already connected to five terminals which exhausts its available bandwidth). In this case, the gateway GW1 uses a second dedicated identifier SSID2 to issue an availability request to other gateways GW2 that are sufficiently close to be connected via a wireless link SF2 to the first gateway GW1. If a second nearby gateway GW2 responds favorably to this request (sufficient available bandwidth) via the link SF2, the gateway GW1 uses the identifier SSID1 to indicate to the terminal TER that a gateway GW2 would be able to satisfy the connection request of the terminal TER. Of course, the gateway GW1 additionally has at least a third identifier SSID3 for sessions specific to the home devices in the household LAN (for example via links such as the wifi link SF4 represented in FIG. 1). This identifier SSID3 is private and is not distributed (not broadcast outside the LAN network).

The terminal TER then attempts to use the wireless link SF3 to connect to the second gateway GW2.

Figure 2:
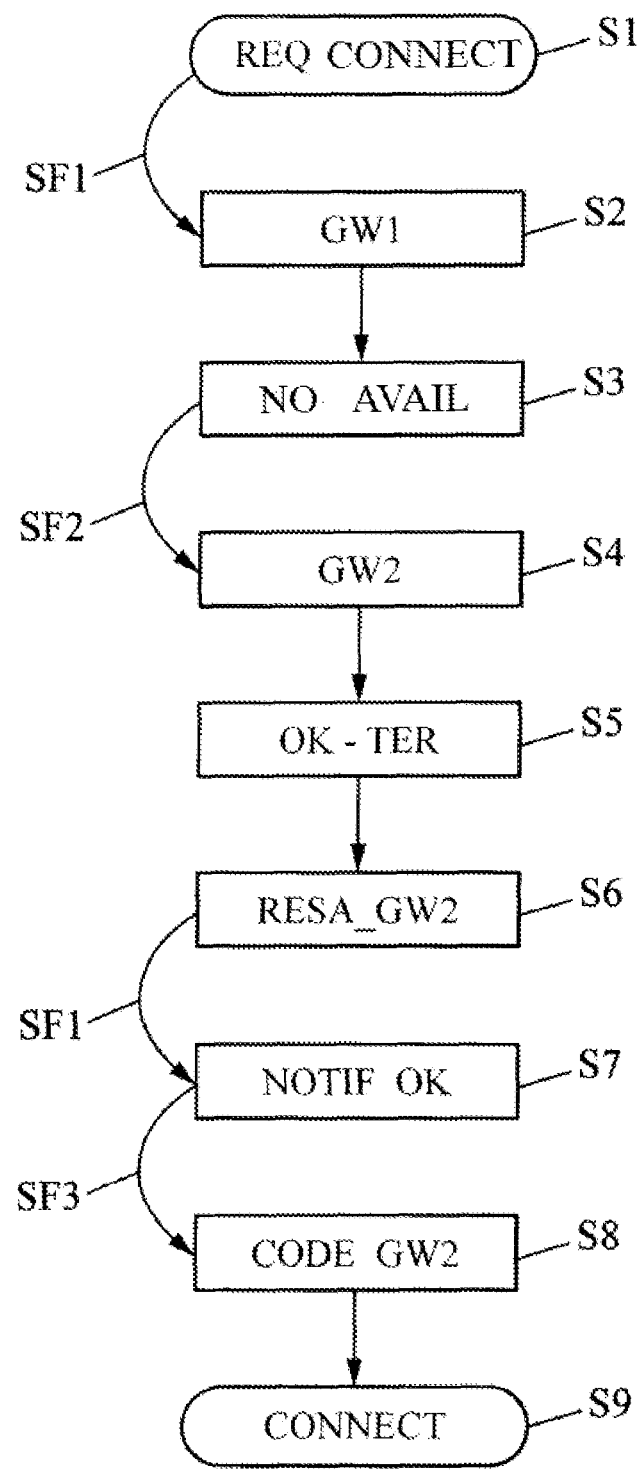

We will now refer to FIG. 2 which summarizes the steps of an example method of the invention.

In the beginning step S1, the client terminal TER requests a connection with an access point such as the gateway GW1, using the link SF1 (step S2). However, in step S3, as the gateway GW1 has no more availability (step S3), it sends the request to other nearby gateways that can act as access points (step S4). The gateway GW2 answers this request by indicating, for example, that there remains sufficient bandwidth to serve two terminals for example (step S5). The first gateway GW1 reserves a part of the bandwidth available at the second gateway GW, for a terminal such as the terminal TER (step S6) and, in step S7, sends to the terminal TER a notification:
  that a connection is available with the necessary bandwidth at gateway GW2,
  that this connection is reserved at gateway GW2,
  and comprising connection parameters, including at least a MAC address or BSSID, as well as a reservation code for example.

Of course, in a variant, if no gateway responds favorably to the request of the first gateway GW1, the latter sends an error message in step S7 indicating that no access point is available.

The client terminal can then connect to the second gateway GW2 and provide its reservation code in step S8 (via the link SF3), and the terminal is finally connected via the second gateway GW2 in the ending step S9.

It is preferable that the above communications, in particular using the SSIDs, be encrypted to avoid any security breaches (man-in-the-middle or other intrusions). For this purpose, the wifi connection electronics of the gateway GW1 advantageously supports "multi-SSID" mode.

Figure 3:
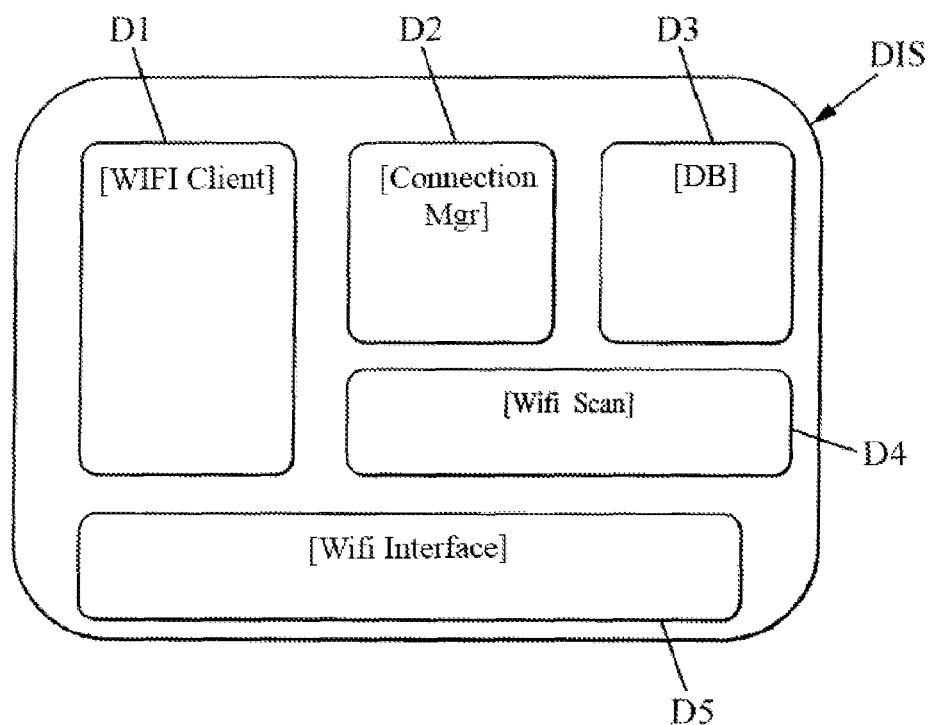

Represented in FIG. 3 is an example architecture of an access point DIS in the sense of the invention which in an example embodiment can be a gateway, particularly in the context of a "wifi community network" service. The reference D1 denotes a public interface for mobile terminals connecting for example by wifi to the access point ("WIFI client"). The reference D2 denotes a module for managing all the connections with mobile terminals or with other access points ("Connection Mgr" module). It records all the exchanges in a database D3. It also ensures availabilities of nearby access points and manages the connection timeslots for a client terminal. The memory module D3 stores said database, which in particular indicates the status of the connections on nearby access points. The access point DIS advantageously additionally comprises a private interface D4 for nearby access points, which performs a background scan ("Wifi Scan") of the availability information for the other access points in real time. This involves said "listening" means which listen for information on resource availability at other access points. This module D4 also decrypts the data to be provided to the management module D2. Of course, the access point DIS additionally comprises a wifi interface D5 (physical interface such as a wifi card supporting communications in "multi-SSID" mode).

In operation, the module D4 retrieves all the data provided by the neighboring access points (for example at regular intervals, every minute), if applicable using the dedicated identifier SSID2 for communication with the access points. It then provides the management module D2 with an updated topography of the connections and bandwidths of the access points in the vicinity of the access point DIS; these data are then stored in the database D3.

When a client terminal connects to the access point DIS in order to request access, via the wifi interface module D5, the request from the client is routed to the wifi client module D1 of the access point in order to manage the entire relation with the client. This module D1 queries the management module D2 to find out the status of the internal and possibly external connections in order to consider an alternative access point. If no resource (or slot) is available at the access point DIS, a request is issued to the database D3 to look up the available access points nearby. If a resource is available at an alternative access point that is nearby, the management module D2 so informs the wifi client D1, which then communicates the connection information (MAC address or BSSID, as well as a reservation code) to the client terminal via the public interface D5. Upon receipt of this information, the client terminal can connect to the alternative access point.

Of course, the invention is not limited to the embodiment described above as an example; it applies to other variants.

For example, access points likely to be in the form of gateways were described above, particularly in the context of a portability service by a "wifi community network". The invention, however, applies more generally to any set of access points capable of communicating with each other.

Also described above with reference to FIG. 2 is the situation where an access point is able or unable to serve a terminal. The invention also applies to finding the optimum bandwidth for a particular bandwidth request from a given terminal A service using the invention would allow, for example, a user to connect to the access point providing the highest bandwidth (with few or no visitor connections).

The invention claimed is:

1. A method for connecting a terminal to a wide area network through a WiFi community network via an access point, the method comprising:
   upon reception of a connection request from a terminal to a first access point, said first access point determines whether the first access point has resources available to serve the terminal, and
   when said first access point has resources available to serve the terminal, said first access point serves the terminal,
   when the first access point is unable to serve the terminal:
      the first access point sends, to at least a second access point to which said first access point is connected, a request for a resource for serving the terminal, and
      when the resource is available at the second access point, the first access point transfers, to the terminal, data for enabling said terminal to connect to the second access point through said WiFi community network; and
   wherein at least two service identifiers are associated with the first access point, comprising:
      a first Service Set Identifier (SSID identifier) as a first connection identifier for communicating with the terminal, and
      a second SSID identifier, distinct from the first SSID identifier, as a second connection identifier for communicating with the second access point;
   preventing thereby an intrusion where a false access point uses the second SSID identifier for communicating with the terminal, rather than said data for enabling the terminal to connect to the second access point.

2. The method according to claim 1, wherein the first access point is a gateway from a household local area network to a wide area network, the communication of the terminal with the gateway being established by a wireless WiFi link, and wherein the gateway uses a third SSID identifier as a third connection identifier for communicating with a household device in the local area network.

3. The method according to claim 1, wherein, in the event of resource availability at the second access point, the first access point reserves a connection for the terminal at the second access point and transfers to the terminal, among said connection data, at least one connection reservation identifier for the second access point.

4. A device for connecting a terminal to a wide area network through a WiFi community network, as an access point for the terminal to said WiFi community network, the device comprising at least a processor for implementing the method according to claim 1, as the first access point.

5. The device according to claim 4, comprising a gateway between a household local area network and said wide area network.

6. The device according to claim 4, comprising:
   a connection manager module for communicating with one or more access points, as second access points,
   and WiFi scan module for listening to information on the availability of said other access points.

7. A system for connecting a terminal to a wide area network through a WiFi community network, via an access point for the terminal to said WiFi community network, comprising at least the device acting as the first access point according to claim 4, and a second access point communicating to said first access point, information on resource availability for serving a terminal.

8. A non-transitory computer readable medium having stored thereon instructions executable by a processor to carry out the method of claim 1.

* * * * *